(12) United States Patent
Rice et al.

(10) Patent No.: US 9,549,535 B1
(45) Date of Patent: Jan. 24, 2017

(54) DOG RETENTION DEVICE

(71) Applicants: Cory Rice, Mammoth Lakes, CA (US); Amanda Rice, Mammoth Lakes, CA (US)

(72) Inventors: Cory Rice, Mammoth Lakes, CA (US); Amanda Rice, Mammoth Lakes, CA (US)

( * ) Notice: Subject to any disclaimer, the term of this patent is extended or adjusted under 35 U.S.C. 154(b) by 109 days.

(21) Appl. No.: 14/662,086

(22) Filed: Mar. 18, 2015

Related U.S. Application Data

(60) Provisional application No. 61/967,467, filed on Mar. 18, 2014.

(51) Int. Cl.
*A01K 27/00* (2006.01)

(52) U.S. Cl.
CPC .................. *A01K 27/003* (2013.01)

(58) Field of Classification Search
CPC .. A01K 27/003; A01K 27/004; A01K 27/008; A01K 27/005
See application file for complete search history.

(56) References Cited

U.S. PATENT DOCUMENTS

| | | | | |
|---|---|---|---|---|
| 2,737,154 A * | 3/1956 | Michonski | ........... | A01K 27/005 119/798 |
| 4,745,883 A * | 5/1988 | Baggetta | .............. | A47D 13/086 119/770 |
| 5,357,904 A * | 10/1994 | Takahashi | ............ | A01K 15/025 119/708 |
| 5,749,326 A * | 5/1998 | Jones | .................... | A01K 27/005 119/798 |
| 6,006,699 A * | 12/1999 | Keever | ................ | A01K 27/005 119/795 |
| 6,053,129 A * | 4/2000 | Akre | ..................... | A01K 27/005 119/795 |
| 6,164,048 A * | 12/2000 | Rhodes | ................ | A01K 27/005 24/115 F |
| 6,382,139 B1 * | 5/2002 | Rhodes | ................ | A01K 27/005 119/776 |
| 7,530,334 B1 * | 5/2009 | Napolitano | .......... | A01K 27/005 119/769 |
| 8,372,023 B2 * | 2/2013 | Garth | ...................... | A61F 5/028 128/876 |
| 2002/0040690 A1 * | 4/2002 | Ganz | ..................... | A01K 27/001 119/792 |
| 2007/0006821 A1 * | 1/2007 | Mitnick | ............... | A01K 27/003 119/795 |
| 2007/0006823 A1 * | 1/2007 | Sandberg | ............. | A01K 15/021 119/856 |
| 2010/0050955 A1 * | 3/2010 | Pacheco | ............... | A01K 27/009 119/719 |
| 2013/0074783 A1 * | 3/2013 | Chapin | ................ | A01K 27/004 119/796 |
| 2014/0076244 A1 * | 3/2014 | Byrne | .................. | A01K 27/003 119/798 |
| 2015/0208613 A1 * | 7/2015 | Krasilczuk | ............... | A01K 1/04 119/792 |

* cited by examiner

*Primary Examiner* — Monica Williams
(74) *Attorney, Agent, or Firm* — Bauer Law Offices

(57) ABSTRACT

A device is configured so as to constrain the movements of a dog. The device has a tubular material which can be extended so that the device can function as a leash or which can be compressed so that the device can be secured around the neck of the dog. A cord may be located within the tubular material when it is extended, and removed from the tubular material and secured when the tubular material is compressed.

7 Claims, 5 Drawing Sheets

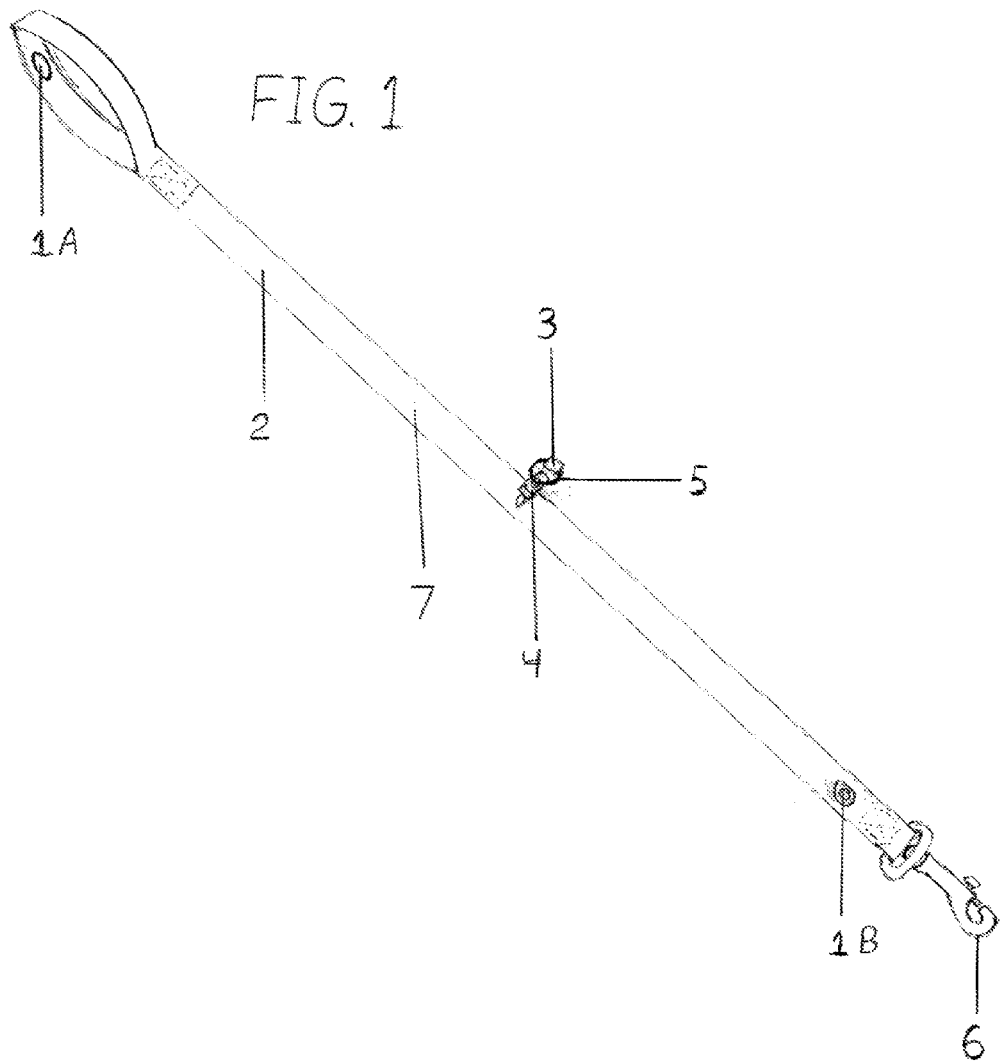

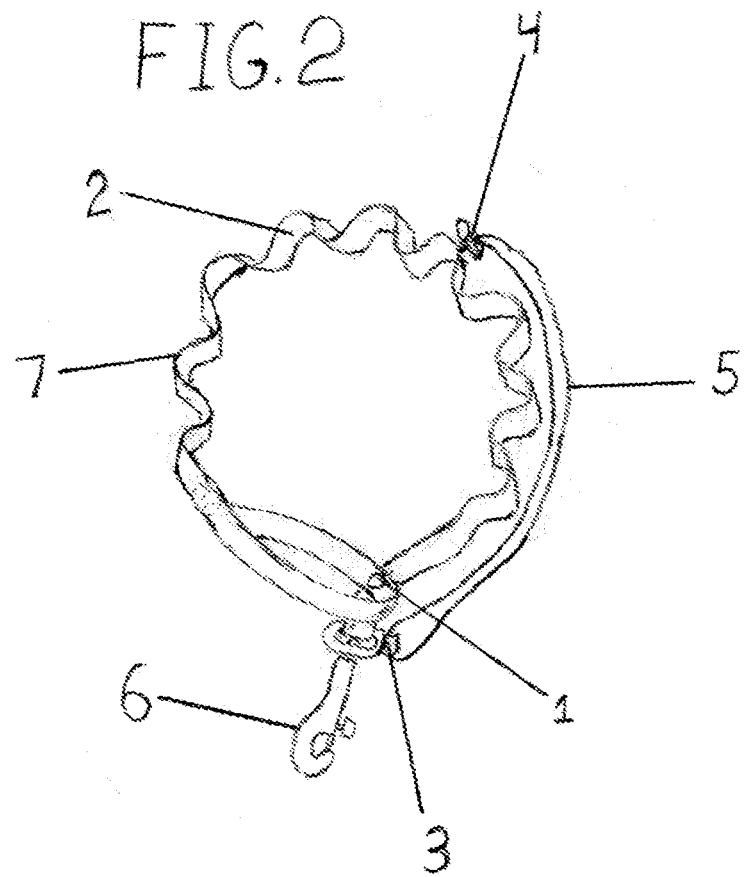

3A. 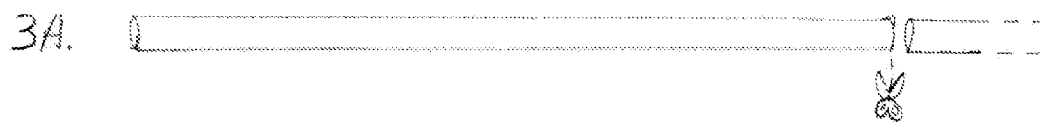
3B. 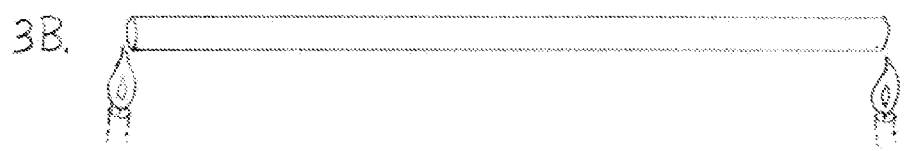
3C. 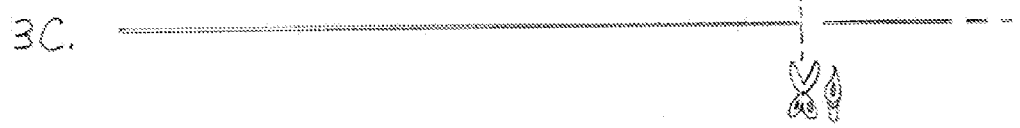
3D. 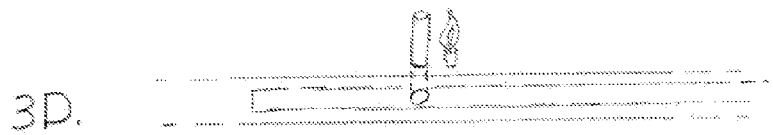
3E. 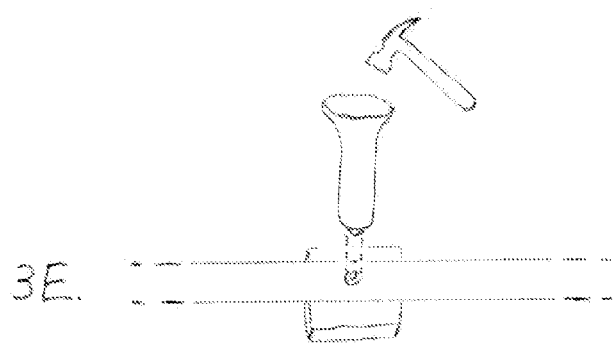

3F. 
3G. 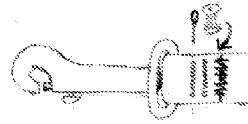
3H. 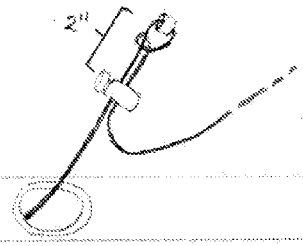
3I. 

3J.
3K.

DOG RETENTION DEVICE

This application claims the priority benefit of U.S. Provisional Patent Application No. 61/967,467 filed on Mar. 18, 2014, which application is hereby incorporated by reference in its entirety.

FIELD OF THE INVENTION

The invention relates to pet accessories. In particular, the invention relates to a dog retention device that can be used as a leash for dogs.

BACKGROUND

Leashes are commonly used for preventing dogs from running too far away from a person. Typically, the leash connects to a harness or a collar around the neck of the dog, and has some sort of handle or other sort of adaptation so that a person can hold the leash to keep the dog within a certain distance. The collar is permanently on the dog, and the leash is utilized when it is desired to limit the distance of the dog, such as when walking in a park or other outside area.

Leashes can be short or long. Longer leashes can be bulky or otherwise unwieldy to carry and can become tangled on the person's legs or other objects as the dog moves. Some leashes are configured to have a variable length. Variable length leashes typically have a mechanism for varying the length, such as a spring-loaded coil mechanism for winding up the leash in a spool. This mechanism can make the leash relatively more expensive to manufacture, bulky or prone to mechanical failure. The material of the leash may also be compromised to facilitate spooling or other action taken to vary the length. This may compromise the strength of the leash or cause it to be made out of a hard or expensive material.

BRIEF SUMMARY

The preferred embodiments of the inventions include a dog retention device that can be arranged to be shorter to fit around a dog's neck (such as a collar or necklace) or body (such as a harness), but can also easily be arranged to be longer to act as a leash. There are several objectives and advantages of the preferred embodiments.

The dog permanently wears the device so that a leash is readily available for the dog whenever desired and does not need to be remembered. The device offers a variable length leash that is less expensive to manufacture than typical variable length leashes. The leash can also be stronger and more suitable than typical length leashes that are spooled or have a spring-like mechanism.

The above objectives and advantages for the preferred embodiments are exemplary only and do not limit the scope of the invention. Still other advantages may be present or become apparent with respect to other embodiments or from the teachings of this patent application.

BRIEF DESCRIPTION OF THE DRAWINGS

FIG. 1 is an illustration of a preferred embodiment of the dog retention device when it is extended and ready for use as a leash.

FIG. 2 is an illustration of the arrangement of the preferred embodiment of the dog retention device when it is used as a collar or necklace on the dog rather than as a leash.

FIGS. 3A-3K are step-by-step illustrations of the process of making a dog retention device according to the preferred embodiment.

DETAILED DESCRIPTION OF THE PREFERRED EMBODIMENTS

Reference Numerals

1—Two Part Snap (1A and 1B)
2—Tubular Webbing (or other flexible material)
3—Magnetic Bead
4—Friction Device
5—Cord
6—Swivel Hook (or other connection device)
7—Dog Retention Device A dog retention device 7 according to the preferred embodiments is comprised of a hollow, tubular webbing 2 with a cord 5 running inside the length of the tubular webbing 2. Cord 5 comes out of a hole in the middle of the tubular webbing 2, goes through a friction device 4, through a magnetic bead 3, back through the friction device 4, and back into the tubular webbing 2. The cord 5 is sewn to both ends of the retention device 7. This allows cord 5 to be pulled, the length of the tubular webbing 2 to be reduced, and then the length of retention device 7 returned to a normal size as desired by a user. A two part snap 1A and 1B connects each end of the device 7. The magnetic bead 3 helps control the extra amount of cord 5 when the leash is short. The friction device 4 may be a cord lock which holds the cord securely in place The tubular webbing 2 is selected so as to be flexible, and yet provide sufficient strength for the device 7 to restrain a dog when extended as shown in FIG. 1. Suitable tubular webbing is tubular polyester webbing or tubular nylon webbing, which can be obtained from Strapworks.com of Eugene, Oreg. Different embodiments may have different versions of the same material to provide different strengths or different embodiments may use different materials. Other materials that may be considered instead of or in combination of the tubular webbing include flexible neoprene, tubular cotton products, and most any other supple yet sturdy tubular material.

FIG. 1 is an illustration of the dog retention device 7 at full extension to act as a leash. As indicated above, rather than wire, rope or cord, the main part of the device 7 is comprised of a tubular webbing or similar material 2. When the dog retention device 7 is used as a leash, the internal cord 5 is located inside of the tubular webbing 2 and serves no function. The swivel hook 6 is the attachment point to a separate collar or harness already on the dog (not shown in FIG. 1). The two part snap 1, magnetic bead 3, and friction device 4 remain present but serve no function when dog retention device 7 is used as a leash.

When a leash is not needed, the user loops the retention device 7 around the dog's neck or body and snaps it together as shown in FIG. 2 to be used as a collar or necklace. The tubular webbing 2 may be patterned or otherwise decorative to increase its attractiveness when it is idly on the dog and not being used as a leash.

To convert retention device 7 from use as a leash, the cord 5 is pulled through the friction device 4, thereby reducing the length of the tubular webbing 2. The user then pulls on magnetic bead 3 and slides the friction device 4 down the cord 5 to reduce the effective length of the tubular webbing 2. Once the desired length is found, the user lets go of the friction device 4 which holds the cord in place. The magnetic bead 3 can connect to the swivel hook 6 (if it is metal) or any metal on the dog's separate collar or harness. This controls the cord 5 when it is external to and not inside the tubular webbing 2. To control the cord 5 even more, the user can wrap it around the retention device 7 before attaching it to any metal.

The tubular webbing 2 is snapped together by two part snap 1A and 1B to form a single unit. This can be placed around the dog's neck or body. The extra cord 5 is held close to the leash and/or dog's neck/body by a magnetic bead 3. As shown, the magnetic bead 3 can connect to the swivel snap hook 6 or other metal parts of a dog's collar or harness. At this time the dog is wearing the retention device 7 like a necklace or collar. The dog can participate in any normal activity.

The retention device 7 can also easily convert from its use as a necklace or collar as shown in FIG. 2 to act as a leash as shown in FIG. 1. The user starts by disconnecting the two part snap 1A and 1B. The friction device (cord lock) 4 automatically lets the accessory cord 5 slide back into the tubular webbing 2. The magnetic bead 3 is pulled off the metal it is attached to, and the tubular webbing 2 is fully extended by the user by manually pulling its two ends apart. The retention device 7 is then able to act as a leash where the properties of the tubular webbing, swivel hook, and how it is sewn provide the strength for the leash.

The preferred embodiments of the invention shown in FIGS. 1 and 2 also has the advantage that it is relatively easy to manufacture as shown in FIGS. 3A-3K. First, cut tubular webbing 2 or other material to a desired length (for example, 5 or 6 feet). See FIG. 3A. If needed, burn ends of tubular webbing 2 to prevent fraying. FIG. 3B. Obtain a cord that is slightly less in length than tubular webbing 2 or cut a longer piece of cord using a hot knife. FIG. 3C. The cord 5 is preferably of small radius, such as 2 mm, and the length for a 5 foot tubular webbing would be, for example, 4'8" long. Place a metal wand in tubular webbing 2 and burn/cut a hole slightly off center from the two ends of the tubular webbing 2. FIG. 3D. A specialized hot knife hole cutter or other device used for snap rivets may be used. The hole may be, for example, 26" from one side of a 5 foot tubular webbing. Slide a rivet down the middle of the tubular webbing 2 and hammer into place using a rivet setter. FIG. 3E. Starting from the side of the tubular webbing 2 with the shortest distance to the rivet, slide tubing down the center of tubular webbing 2. FIG. 3F. Push the cord 5 through the tubing and out the rivet. Pull the tubing out and pull the cord 5 about an inch into the tubular webbing 2.

Sew the swivel snap hook 6 on to the end of the tubular webbing 2 (using, for example, 3 inches of the tubular webbing to ensure a strong connection). FIG. 3G. Fold it away from the rivet side. Use three bar tack stitches with one of them holding the end of the tubular webbing down. Put the end of cord 5 through the friction device 4 and then through the magnet. FIG. 3H. Tie the magnet in place, preferably about 2" from the cord lock 4. Put the end of the cord 5 back through the cord lock 4, double checking that there is a suitable distance, preferably about 2 feet, from the cord lock 4 to the magnet 3. Slide the tubular webbing 2 down the center of the tubular webbing 2 stopping at the rivet. FIG. 3I. Push the rest of the cord through the tubular webbing. Pull the tubular webbing 2 out. Use part of the tubular webbing, preferably about 12 inches, to create a handle. FIG. 3J. Fold it away from the rivet side and sew in place using three bar tack stitches with one of them holding down the end of the tubular webbing 2. Put in each end of two part snap 1A and 1B using an appropriate tool, such as a specialized large needle. One end on the handle with the smoothest part of the snap should face the inner handle. With the rivet side up, place just before the end of the tubular webbing 2. The other end of the snap next to the sewing holding the swivel snap hook. With rivet side up, place at the top and so the snap is the same as rivet side.

Although preferred embodiments have been described above, other embodiments may be within the scope of the invention which shall be determined by the claims as currently pending or as may be amended from time to time hereafter.

What is claimed is:

1. A dog retention device, comprising:
   a tubular material, the tubular material being hollow between a connecting part at a first end thereof and a second end thereof configured as a handle;
   the tubular material having first and second connection devices on the exterior thereof, such that when the first and second connection devices are connected, the tubular material is connected to itself in a circle shape;
   a cord, contained in the hollow of the tubular material;
   the tubular material having a hole between the first and second ends thereof, the hole permitting the cord to be located internally of the tubular material when the tubular material is extended and pulled externally to compress the tubular material; and
   a securing element on the cord, the securing element enabling the cord to be secured to either the exterior of the tubular material or to another device when the tubular material is compressed and connected to itself in a circle shape.

2. The dog retention device as recited in claim 1, wherein the tubular material comprises a tubular wedding.

3. The dog retention device as recited in claim 1, wherein the tubular material can be extended so that it is at least five feet in length and can also be compressed so that it is no more than 18 inches in length.

4. The dog retention device as recited in claim 1, further comprising a friction device controlling and securing the position of the cord.

5. The dog retention device as recited in claim 1, wherein the exterior of the tubular material is decorated and the exterior is visible both when the dog retention device is extended and when it is compressed.

6. The dog retention device as recited in claim 1, wherein the securing element is a magnet.

7. The dog retention device as recited in claim 1, wherein the first and second connection devices comprise first and second snaps.

* * * * *